United States Patent [19]
Snowden et al.

[11] Patent Number: 5,930,681
[45] Date of Patent: Jul. 27, 1999

[54] METHOD AND APPARATUS FOR CONSERVING ENERGY IN A SELECTIVE CALL RECEIVER

[75] Inventors: Gregory O. Snowden, Boca Raton, Fla.; Patrick O. Smith, Damastus, Md.

[73] Assignee: Motorola, Schaumburg, Ill.

[21] Appl. No.: 08/847,134

[22] Filed: Apr. 30, 1997

[51] Int. Cl.$^6$ ........................................ H04Q 7/14
[52] U.S. Cl. ................ 455/13.4; 455/38.3; 455/574
[58] Field of Search .................... 455/13.4, 31.1, 455/31.2, 31.3, 38.1, 38.3, 343, 574, 13.1, 13.2, 13.3; 340/825.54, 825.44, 825.03; 370/321, 337, 345

[56] References Cited

U.S. PATENT DOCUMENTS

| | | | |
|---|---|---|---|
| 4,330,857 | 5/1982 | Alvarez, III et al. | 370/321 |
| 5,257,019 | 10/1993 | Schwendeman et al. | 455/38.1 |
| 5,392,451 | 2/1995 | Schwendeman et al. | 455/13.4 |
| 5,473,667 | 12/1995 | Neustein | 340/825.44 |
| 5,542,117 | 7/1996 | Hendricks et al. | 455/343 |
| 5,613,194 | 3/1997 | Olds et al. | |
| 5,659,298 | 8/1997 | Brooks et al. | 455/38.1 |
| 5,689,805 | 11/1997 | Ayerst et al. | 455/31.1 |

*Primary Examiner*—Dwayne D. Bost
*Assistant Examiner*—Jean A. Gelin
*Attorney, Agent, or Firm*—Eduardo Guntin

[57] ABSTRACT

A radio communication system (5) includes a transmitting unit (1) coupled to at least one controller (6). The controller (6) is adapted to subdivide the SCR's (selective call receivers) (2) into SCR groups, assign the SCR groups to supergroups, and assign a selected number of message frames (216) and message intervals (208) to each SCR group in each supergroup. A supergroup is then selected, and included in an acquisition group message. The supergroup is for directing SCR's (2) targeted to receive the acquisition group message to monitor messages during the message reception interval (203) according to the supergroup. The controller (6) then invokes the transmitting unit (1) to transmit the acquisition group message to the SCR's (2). Messages target for specific SCR's (2) are then generated, and transmitted by way of the transmitting unit (1) according to the supergroup selected. The targeted SCR's (2) receive the messages according to the supergroup received.

24 Claims, 6 Drawing Sheets

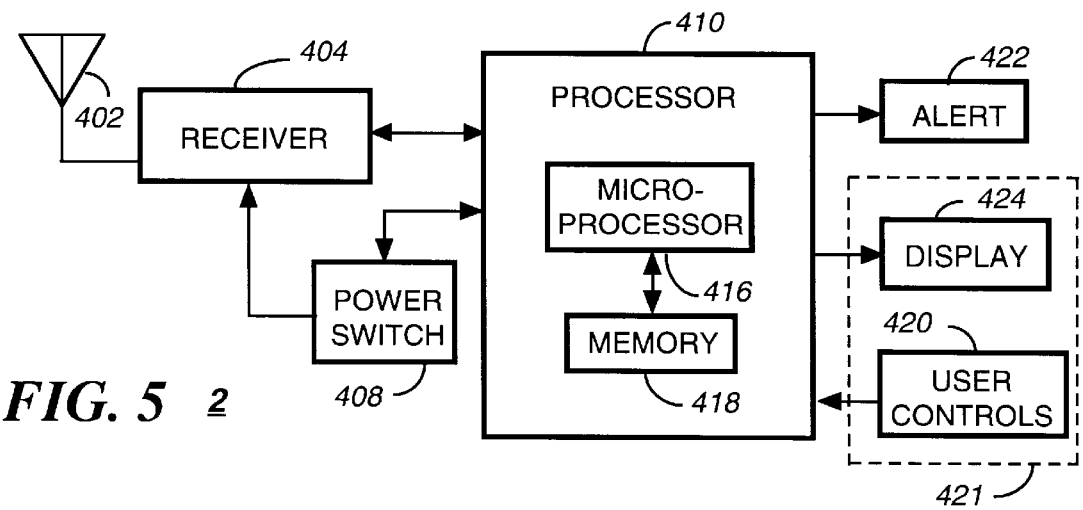
FIG. 5  *2*
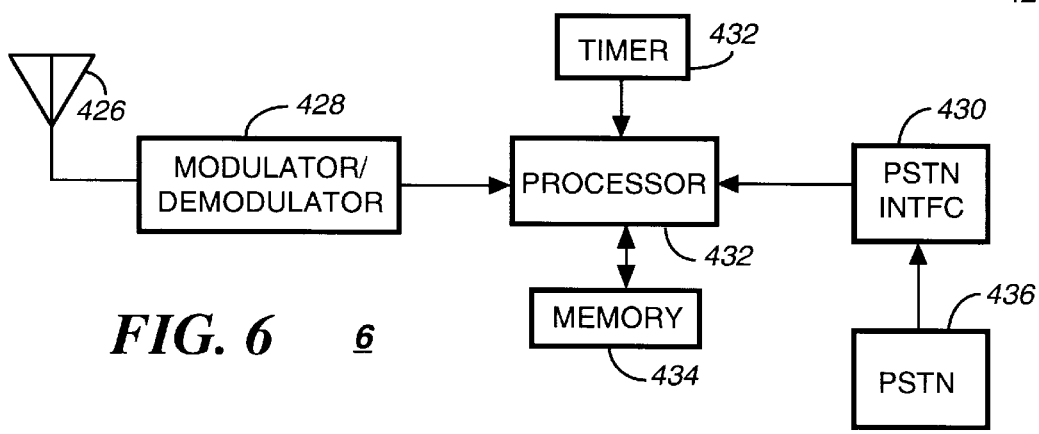
FIG. 6  *6*
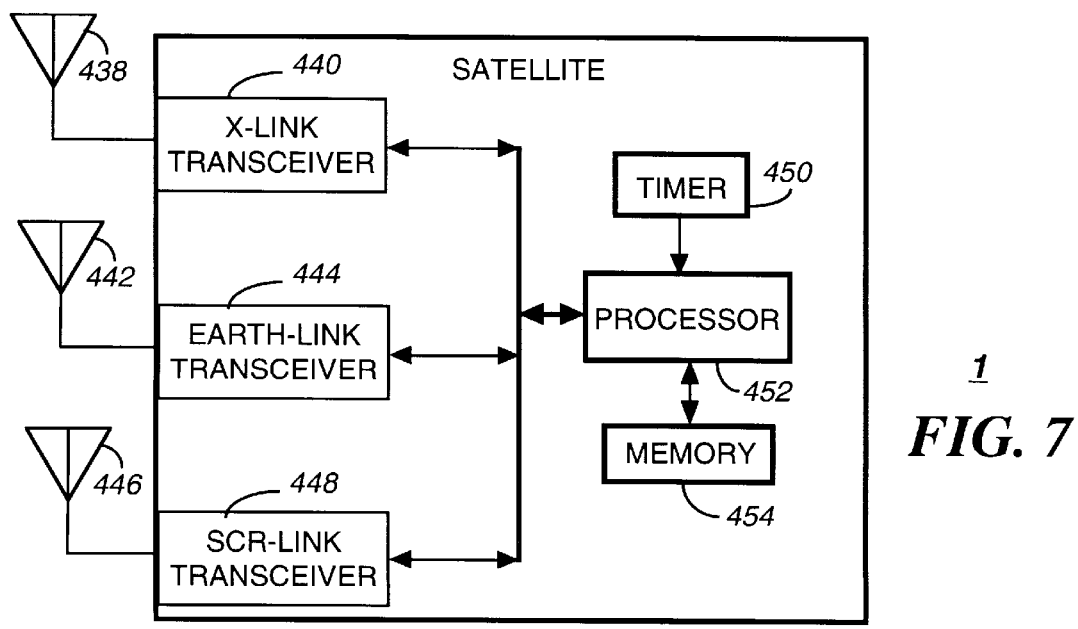
*1*
FIG. 7

METHOD AND APPARATUS FOR CONSERVING ENERGY IN A SELECTIVE CALL RECEIVER

FIELD OF THE INVENTION

This invention relates in general to satellite communication systems, and particularly to a method and apparatus for conserving energy in selective call receivers operating in a radio communication system.

BACKGROUND OF THE INVENTION

With the advent of new technologies such as portable radio selective call units and radio infrastructures for communicating messages thereto, individuals within domestic regions have been able to receive custom messages from other users at remote locations for sometime now. Typical forms of custom radio communications include, but are not limited to, electronic mail messages, paging messages and cellular telephony messages. Currently, most custom radio messaging systems are stationed on earth, and are limited geographically in their land coverage capacity.

Satellite communication systems, in contrast, have a substantial coverage capacity. It is for this reason that satellite communication systems have helped to revolutionize the dissemination of information worldwide. This is most apparent in the worldwide broadcasting of television signals. With potential for worldwide communication using satellite communication systems and with current advances in such systems, industry leaders have joined forces to develop worldwide satellite communication systems, which can provide cellular telephony services, paging services, and possibly much more.

An immediate problem faced by such consortiums is in the development of a satellite communication system which is cost effective to introduce, and cost effective to maintain. An additional challenge encountered by the communications industry is the development of satellite communication systems which support the use of selective call units that are compact and that have a battery life performance comparable to existing selective call units used domestically today. A key factor affecting cost, compactness, and battery efficiency of satellite-based selective call units is the type of communication protocol employed by a worldwide satellite communication system.

Accordingly, there is a substantial need for a communication protocol which provides a cost effective introduction and maintenance of satellites and selective call units. Additionally, there is a need for a communication protocol which optimizes battery resources in selective call units operating in a worldwide satellite communication system.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

FIGS. 5 through 7 depict electrical block diagrams of an SCR, a controller and a satellite, respectively, according to the present invention.

DESCRIPTION OF THE PREFERRED EMBODIMENT

The signaling protocol, method, and apparatus to be described for the present invention is related to the satellite communication system described in U.S. Pat. No. 5,613,194 issued Mar. 18, 1997 to Olds et al., and entitled "Satellite-Based Cellular Messaging System and Method of Operation Thereof," assigned to the assignee of the present invention, and which is hereby incorporated by reference.

Figure 1:
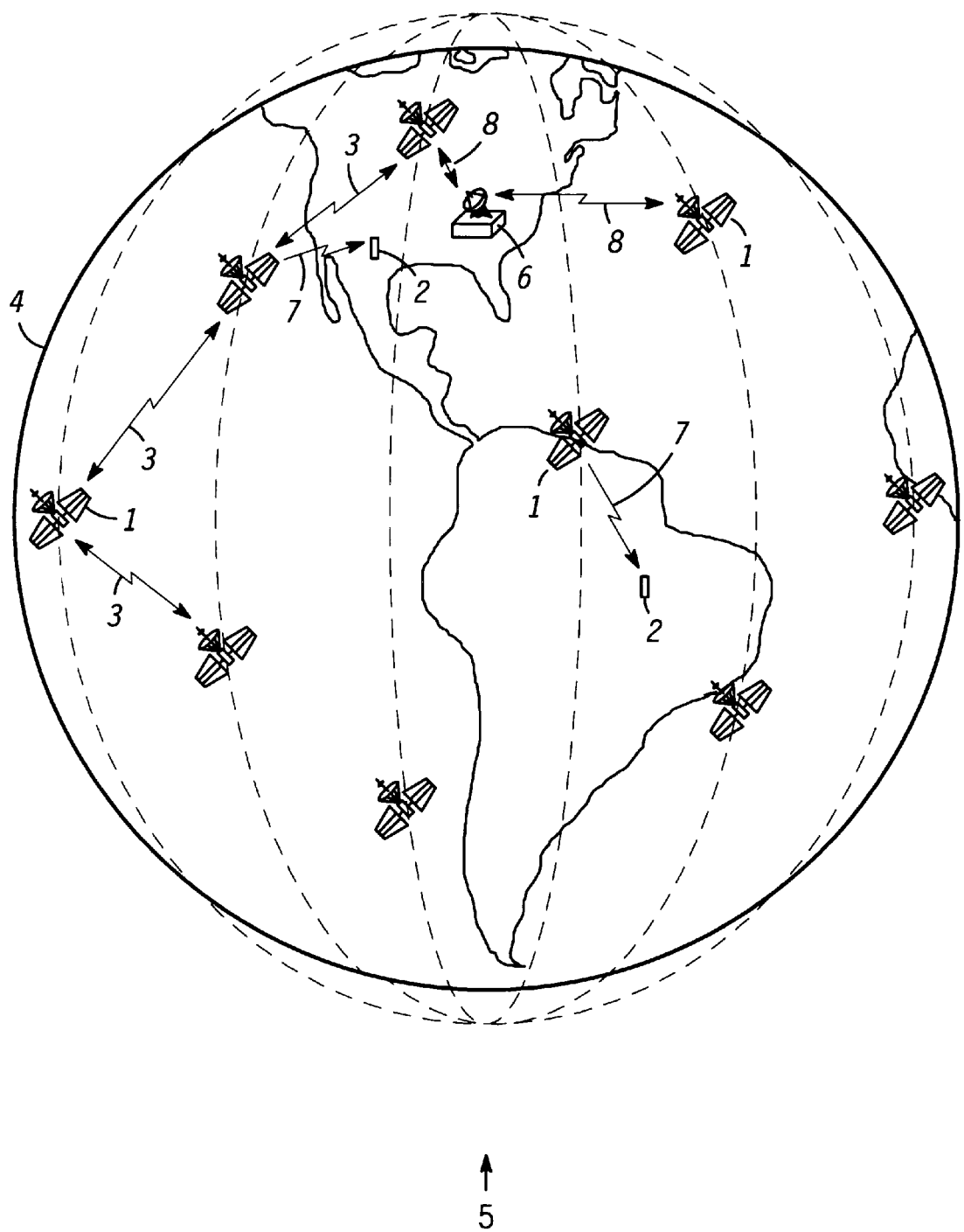
FIG. 1 shows a diagram of a radio communication system according to the present invention.

FIG. 1 shows an overview diagram of a radio communication system 5 according to the present invention. For simplicity, the radio communication system 5 is herein referred to as the system 5. Preferably the system 5 is a satellite communication system comprising at least one controller 6 coupled to a transmitting unit including at least one satellite 1 having a transmitter. It will be appreciated, however, that the present invention is also applicable to an earth-based radio communication system, wherein the transmitting unit is at least one earth-based conventional radio transmitter. Since the operation of either embodiment is substantially similar for the present invention, the ensuing discussions will focus on the embodiment of a satellite communication system.

According to FIG. 1, several satellites 1 are placed in a relatively low orbit around the earth 4. These satellites 1 are preferably placed in orbits so that the entire constellation of satellites 1 provides continual coverage for the entirety of earth 4. In addition to the satellites 1, the system 5 includes one or more controllers 6 stationed on earth 4. Each controller 6 is functionally equivalent to the operation of a central switching office 6 (or "gateway"). For simplicity, each controller 6 is herein referred to as an office 6. Offices 6 reside on the earth's 4 surface and are in communication with nearby satellites 1 through RF communication links 8. Satellites 1 are also in communication with one another through data communication links 3. Through the constellation of satellites 1, an office 6 may provide communications coverage to any size region on earth 4. Offices 6 couple to public switched telecommunication networks (not shown) through which requests for the placement of calls to subscribers of the system 5 may be received. Each office 6 receives requests to place calls to subscribers believed to be located in a region of earth 4 associated with that office 6. FIG. 1 shows only one office 6 for convenience.

However, it should be clear to those skilled in the art that any number of offices 6 may be employed in association with any number of regions on earth 4. It will be further appreciated that all offices 6 could operate in a distributed manner, or collectively in communication with one designated office 6 which relays messages from all offices 6 to the constellation of satellites 1 in the system 5.

The system 5 also includes any number, potentially in the millions, of SCR's 2 (selective call receivers) such as pagers or other one-way portable units. SCR's 2 are configured to receive communications from overhead satellites 1 over communication links 7. Preferably, links 7 utilize RF frequencies which accommodate substantially line-of-sight communication, and links 7 are simplex links. In other words, communications travel only in one direction from satellites 1 to SCR's 2. Simplex communication allows SCR's 2 to be manufactured as small inexpensive units that consume low amounts of power. No simplex communication limitation is implied with respect to links 3 or 8. Rather, these links are for satellite-to-satellite communication and office-to-satellite communication, respectively.

Figure 2:
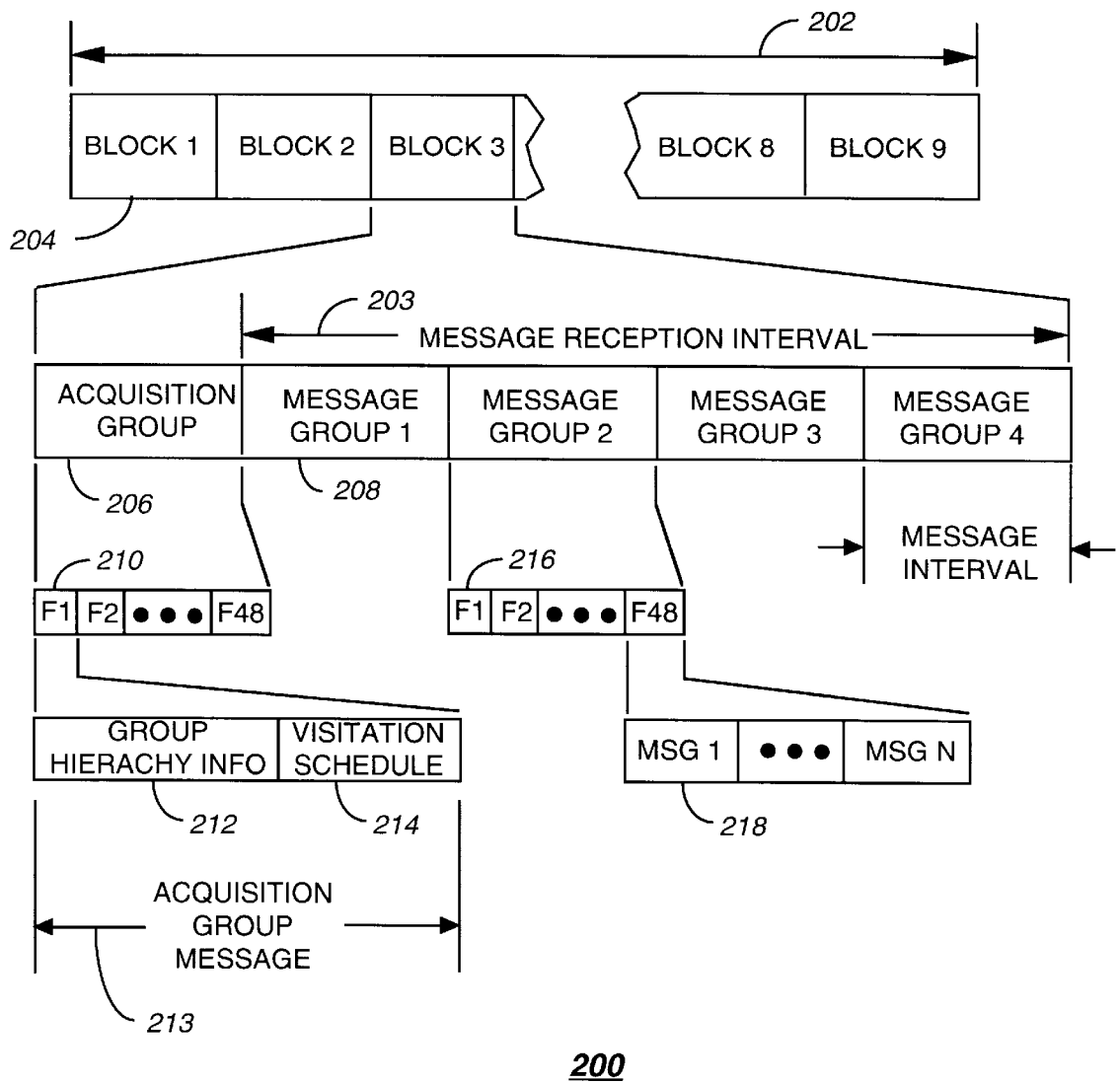
FIG. 2 shows a timing diagram depicting a communication protocol used by a satellite communication system according to the present invention.

FIG. 2 shows a timing diagram depicting a communication protocol 200 utilized by the system 5 for communicating with the SCR's 2 according to the present invention. During a communication cycle 202 (preferably having a duration of 194.4 sec), the communication protocol 200 comprises nine block intervals 204 (each preferably having a duration of 21.6 sec). Each block interval 204 is subdivided into an acquisition group message interval 206 immediately followed by a message reception interval 203 comprising four message intervals 208. Preferably, each of the SCR's 2 is assigned to one of the nine block intervals 204 for monitoring messages 218. It will be appreciated that, alternatively, each SCR 2 may be assigned to one or more of the nine block intervals 204.

Generally, offices 6 control communications to large geographic regions on earth 4. In particular, offices 6 control satellite 1 transmissions to a plurality of cell regions. Each cell region is a subdivision of a large geographic region associated with an office 6. In order to track the location of SCR's 2 on earth 4, users of SCR's 2 must register their units when traveling between cell regions (e.g., cities) or when traveling between large regions associated with different offices 6 (e.g., countries). Since a cell region associated with an office 6 is substantially large, user registration of an SCR 2 is not often required during a user's stay at a particular region.

By assigning one block interval 204 to an SCR 2, the SCR 2 activates only during the assigned block interval 204. This, as shall be seen, hierarchically provides a first-level battery saving capability to the population of SCR's 2 and satellites operating in system 5. The acquisition group message interval 206 is used by the system 5 to transmit at least one acquisition group message 213. For the present example, the system 5 preferably transmits a plurality of acquisition group messages 213, each during a selected one of the 48 frames 210 shown in FIG. 2. Each acquisition group message 213 comprises a group hierarchy information field 212, and a visitation schedule field 214. These fields provide SCR's 2 information used for determining the manner in which messages are monitored during the message reception interval 203. It will be appreciated that additional fields may be used in the acquisition group message interval 206 such as, for example, a field that directs SCR's 2 to use a particular frequency channel selected from a plurality of possible frequency channels for receiving messages 218. Additionally, it will be appreciated that the order of the fields 212, 214 is not relevant, and could be changed without affecting the operation of the communication protocol 200.

Similarly, each of the plurality of message intervals 208 comprise a plurality of message frames 216 (preferably 48 of them). During each message frame 216 one or more messages 218 may be transmitted by the system 5 to one or more targeted SCR's 2. The visitation schedule field 214 comprises digital data, which directs targeted SCR's 2 to monitor messages in a selected number of the 48 message frames 216 during each of the plurality of message intervals 208.

To accomplish this, the visitation schedule field 214 comprises 48 bits of data. Each bit position in the visitation schedule field 214 has a direct correspondence with the 48 message frames 216 included in each of the message intervals 208. A logical "1" in any of the 48 bit positions in the visitation schedule field 214 indicates to an SCR 2 that it must monitor messages during a specific one of the 48 message frames 216 during each of the four message intervals 208. For example, a logical "1" found in bit positions 16, 19, 40, and 43 and a logical "0" in all other bit positions, indicates to an SCR 2 that it must monitor messages during message frames 216 numbered as 16, 19, 40 and 43 (shown in FIG. 2) during each of the four message intervals 208. During all other message frames 216 (i.e., frames 1–15, 17–18, 20–39, 41–42 and 44–48), the SCR's 2 power down during each of the four message intervals 208.

As should be apparent from this description, the visitation schedule field 214 provides yet a second-level of battery saving capability in SCR's 2. Although the hierarchical combination of a block interval 204 assignment and the dynamic assignment of one or more message frames 216 by way of the visitation schedule field 214 results in a substantial battery saving capability in SCR's 2, additional battery saving capability is desirable.

To gain this flexibility, the communication protocol 200 makes use of the group hierarchy information field 212 shown in FIG. 2. Similar to the visitation schedule field 214, the group hierarchy information field 212 includes digital data which directs targeted SCR's 2 to monitor messages during a selected number of the plurality of message frames 216 and message intervals 208. Tables 1 and 2 below illustrate, by way of example, the operation of two alternative embodiments of the group hierarchy information field 212. For convenience, the group hierarchy information field 212 has been abbreviated as "GH field".

TABLE 1

| GH Field | Message Frames 1–48 | | | |
|---|---|---|---|---|
| | 1–12 | 13–24 | 25–36 | 37–48 |
| 00 | A,B | A,B | C,D | C,D |
| 01 | A | B | C | D |
| 10 | A,B,C,D | A,B,C,D | A,B,C,D | A,B,C,D |

TABLE 2

| GH Field | Message Intervals 1–4 | | | |
|---|---|---|---|---|
| | 1 | 2 | 3 | 4 |
| 00 | A,B | A,B | C,D | C,D |
| 01 | A | B | C | D |
| 10 | A,B,C,D | A,B,C,D | A,B,C,D | A,B,C,D |

Table 1 illustrates a first embodiment of the group hierarchy information field 212. The first column of Table 1 corresponds to the group hierarchy information field 212, which in this example comprises 2 bit codes, thereby providing 1 of 4 possible instructions to SCR's 2 (one of which is not used in this example). The next four columns comprise a selected number of message frames 216, which are assigned to one or more SCR groups. In this example their are four SCR groups (shown by way of example as SCR groups A, B, C, and D). SCR groups comprise a subdivision of the worldwide population of SCR's 2 in the satellite communication system 5. Preferably, the SCR's 2 are subdivided into SCR groups based on a plurality of address ranges of the SCR's 2.

For example, suppose that there are one million SCR's 2 worldwide, and suppose that the SCR's are numbered sequentially. In such a case, SCR's 2 within the address range from 1–250,000 would be assigned to SCR group A, SCR's 2 within the address range from 250,001–500,000 would be assigned to SCR group B, SCR's 2 within the address range from 500,001–750,000 would be assigned to SCR group C, and SCR's 2 within the address range from 750,001–1,000,000 would be assigned to SCR group D. It should be apparent to one skilled in the art that an indefinite number of assignment methods may be employed for parsing the worldwide population of SCR's 2 into distinct sets of SCR groups. Although Table 1 pertains to an example comprising four SCR groups, it will be appreciated that the SCR population may be subdivided into more or less SCR groups without changing the operation of the present invention.

Proceeding with the description of Table 1, each row of this table is representative of a supergroup. For the present embodiment, each supergroup is assigned SCR groups, which are in turn assigned to a unique set of message frames 216. For example, binary code "00" is representative of a supergroup where SCR groups A and B are assigned to message frames 216 numbered as 1–24, and where SCR groups C and D are assigned to message frames 216 numbered as 25–48. The binary code "01" represents yet another supergroup in which SCR group A is assigned to message frames 216 numbered as 1–12, SCR group B is assigned to message frames 216 numbered as 13–24, SCR group C is assigned to message frames 216 numbered as 25–36, and where SCR group D is assigned to message frames 216 numbered as 37–48. A third supergroup is represented by binary code "10" in which SCR groups A–D are assigned to all 48 message frames 216.

For the embodiment represented by Table 1, SCR groups A–D are assigned to all four message intervals 208 during the message reception interval 203. The operation of this embodiment will be described shortly after the discussion of Table 2, which immediately follows.

In contrast to Table 1, Table 2 assigns to SCR groups A–D, for each supergroup, a combination of message intervals 208. For example, binary code "00" is representative of a supergroup where SCR groups A and B are assigned to the 1st and 2d message intervals 208, and where SCR groups C and D are assigned to the 3d and 4th message intervals 208. The binary code "01" represents yet another supergroup in which SCR group A is assigned to the 1st message interval 208, SCR group B is assigned to the 2nd message interval 208, SCR group C is assigned to the 3rd message interval 208, and where SCR group D is assigned to the 4th message interval 208. A third supergroup is represented by binary code "10" in which SCR groups A–D are assigned to all four message interval 208. Note for the embodiment of Table 2, SCR groups A–D are assigned to all 48 message frames 216 of a selected number of message intervals 208.

It will be appreciated by one of ordinary skill in the art that more or less supergroups may be used for each table. Moreover, the bit codes used by the group hierarchy information field 212 may be communicated using unused bit states from other fields transmitted during the acquisition group message interval 206.

Figure 4:
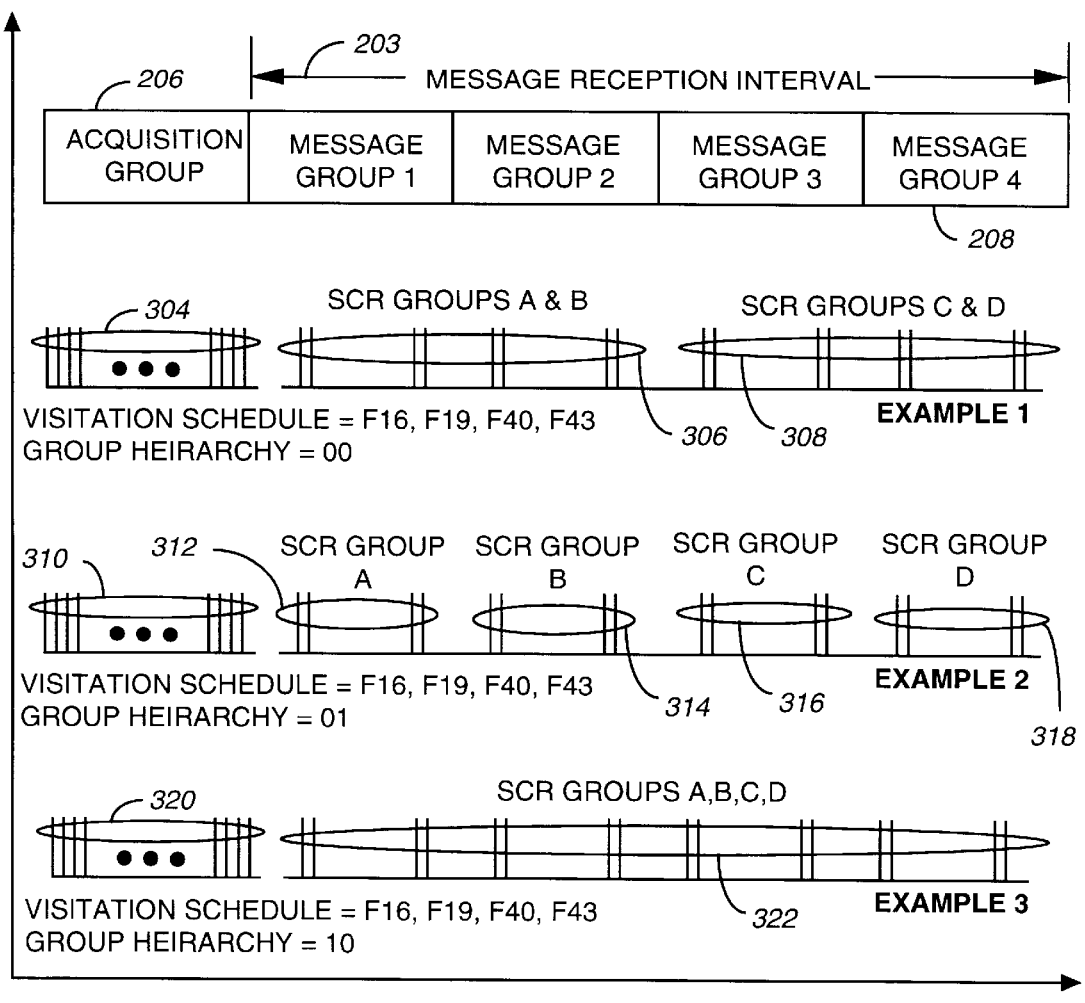

Combining the function of the group hierarchy information field 212 and the visitation schedule field 214 results in a advantageous method for conserving energy in SCR's 2. FIGS. 4 and 5 provide illustrative examples of the combined use of the group hierarchy information field 212 and the visitation schedule field 214 under two alternative embodiments.

Figure 3:
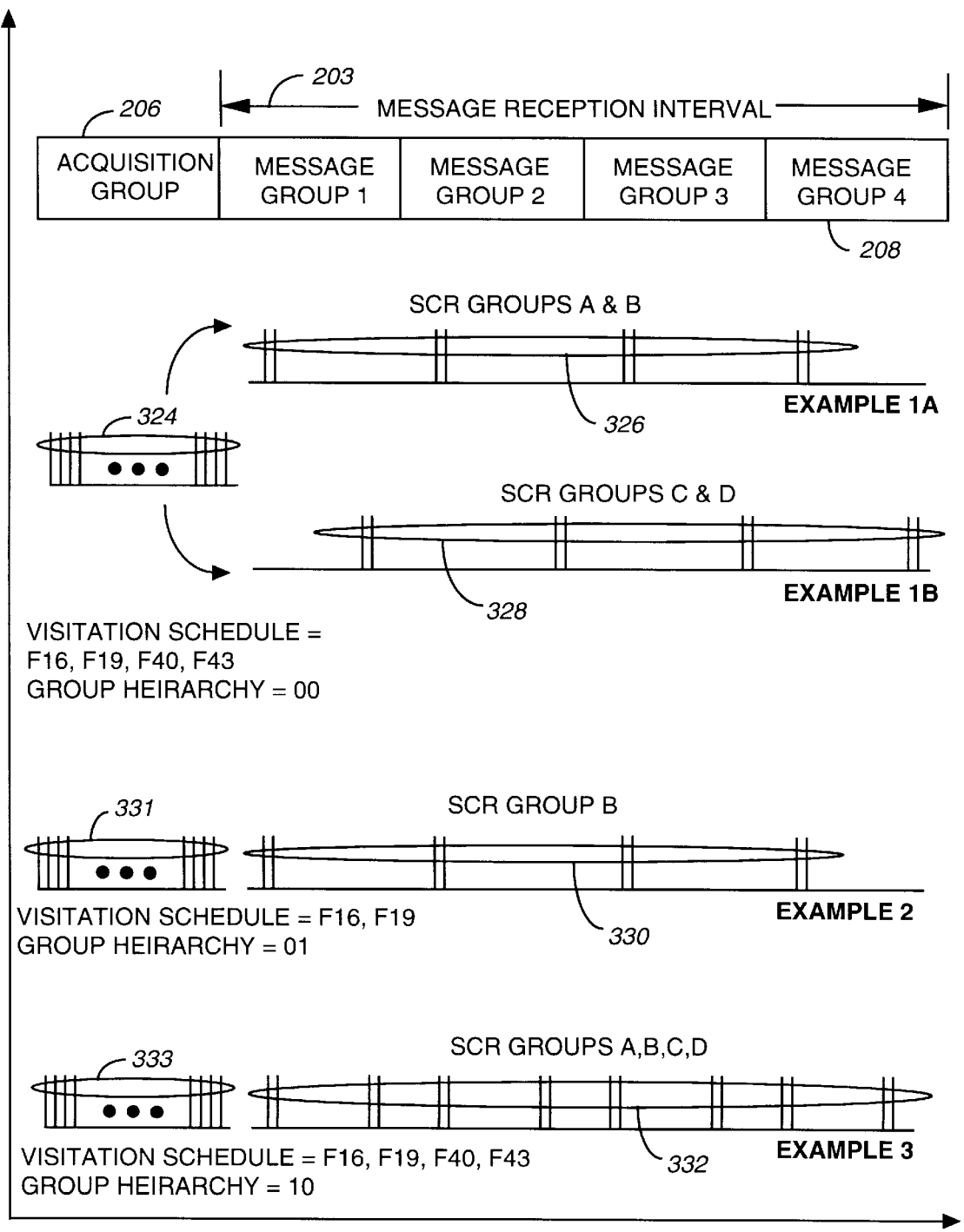
FIGS. 3 and 4 show timing diagrams illustrating how SCR's utilizing the communication protocol can preserve a substantial amount of energy according to the present invention.

The three examples shown in FIG. 3 are representative of an embodiment of the group hierarchy field 212 according to the example presented in Table 1. For convenience, the first example is subdivided into two timing portions (Example 1A and 1B). In this example, the visitation schedule field 214 directs SCR's 2 to monitor data in message frames 216 numbered as 16, 19, 40 and 43. The example begins with an acquisition group message 213 being received by SCR's 2 (from the 48 acquisition group messages 213 transmitted by the system 5—illustrated by the timing portion 324). The acquisition group message 213 includes a group hierarchy information field 212 having the binary code "00".

This code directs SCR groups A and B to monitor messages during any one of message frames 216 numbered as 1–24 and during all message intervals 208. Additionally, this code directs SCR groups C and D to monitor messages during any one of message frames 216 numbered as 25–48 and during all message intervals 208. Since SCR groups A and B can only monitor message frames 216 numbered as 1–24, the assignment of message frames 216 numbered as 40 and 43 by the visitation schedule field 214 is ignored. Similarly, since SCR groups C and D can only monitor message frames 216 numbered as 25–48, the assignment of message frames 216 numbered as 16 and 19 is ignored. These assignments are illustrated by timing portions 326, 328.

Example 1 is appropriate when SCR groups A and B, and SCR groups C and D have messages, which in volume, can be distributed among two message frames 216 of each message interval 208. By distributing messages in this manner, the battery life performance of SCR's 2 in each SCR group is substantially optimized when contrasted to the situation where all SCR's 2 "always" monitor messages during all message intervals 208 and all message frames 216 designated by the visitation schedule field 214.

In example 2, an acquisition group message 213 is received by SCR's 2 (from the 48 acquisition group messages 213 transmitted by the system 5—illustrated by the timing portion 331). The acquisition group message 213 comprises a visitation schedule field 214 directing SCR's 2 to monitor messages during message frames 216 numbered as 16 and 19 only. Also, the group hierarchy information field 212 has a binary code "01". This code directs SCR group A to monitor messages during any one of message frames 216 numbered as 1–12, SCR group B to monitor messages during any one of message frames 216 numbered as 13–24, SCR group C to monitor messages during any one of message frames 216 numbered as 25–36, and SCR group D to monitor messages during any one of message frames 216 numbered as 37–48. This assignment is illustrated by timing portion 330.

Since the visitation schedule field 214 directs the SCR groups to monitor message frames 216 numbered as 16 and 19 only, SCR groups A, C and D ignore this instruction, and therefore power down during all message frames 216 and message intervals 208, thereby conserving a substantial amount of energy. Only SCR group B monitors messages during message frames 216 numbered as 16 and 19 during all message intervals 208. Example 2 illustrates a situation where messages are directed only to one SCR group. It should be obvious to one of ordinary skill in the art that by superposition all SCR groups A, B, C, and D can be targeted to receive messages while each individual SCR group monitors only those messages targeted to its specific SCR group.

Finally, in example 3, an acquisition group message 213 is received by SCR's 2 (from the 48 acquisition group messages transmitted by the system 5—illustrated by the timing portion 333). The acquisition group message 213 comprises a visitation schedule field 214 directing SCR's 2 to monitor messages during message frames 216 numbered as 16, 19, 40 and 43. Additionally, the group hierarchy information field 212 has a binary code "10". This code directs SCR groups A–D to monitor messages in any one of message frames 216 numbered as 1–48. Hence, SCR groups A–D, under the direction of the visitation schedule field 214, monitor messages in message frames 216 numbered as 16, 19, 40 and 43 during each message interval 208. Example 3 accounts for the situation where the maximum flexibility in allocating messages to frames and SCR groups is required.

The three examples shown in FIG. 4 are representative of alternative embodiments of the group hierarchy field 212 according to the example presented in Table 2. For each example in FIG. 4, the visitation schedule field 214 directs SCR's 2 to monitor data in message frames 216 numbered as 16, 19, 40 and 43.

In the first example shown in FIG. 4, an acquisition group message 213 received by SCR's 2 (from the 48 acquisition group messages transmitted by the system 5—illustrated by the timing portion 304) includes a group hierarchy information field 212 having the binary code "00". This code directs SCR groups A and B to monitor messages during any one of the first two message intervals 208 and during message frames 216 numbered as 16,19, 40 and 43. This code also directs SCR groups C and D to monitor messages during any one of the last two message intervals 208 and during message frames 216 numbered as 16, 19, 40 and 43. The assignment for SCR groups A and B is illustrated by the timing portion 306. Similarly, the assignment for SCR groups C and D is illustrated by timing portion 308.

This supergroup is appropriate when SCR groups A and B, and SCR groups C and D have messages which in volume can be distributed among only two message intervals 208. By distributing messages in this manner, the battery life performance of SCR's 2 in each SCR group is substantially optimized when contrasted to the situation where all SCR's 2 "always" monitor messages during all message intervals 208 and all message frames 216 designated by the visitation schedule field 214.

The supergroup illustrated by example 2 shows how battery life performance of SCR's 2 can be optimized further than the optimization provided by the supergroup of example 1. In this example, an acquisition group message 213 received by SCR's 2 (from the 48 acquisition group messages transmitted by the system 5—illustrated by the timing portion 310) includes a group hierarchy information field 212 having the binary code "01". This code directs SCR group A to monitor messages during the 1st message interval 208, SCR group B to monitor messages during the 2d message interval 208, SCR group C to monitor messages during the 3d message interval 208, and SCR group D to monitor messages during the 4th message interval 208. SCR groups A–D monitor message frames 216 numbered as 16, 19, 40 and 43 during their assigned message intervals 208. These assignments are illustrated by timing portions 312–318.

It should be apparent that this supergroup requires the least amount of energy dissipation by the SCR's 2, since there is activity only during one message interval 208 for each SCR 2.

Finally, in example 3, an acquisition group message 213 received by SCR's 2 (from the 48 acquisition group messages transmitted by the system 5—illustrated by the timing portion 320) includes a group hierarchy information field 212 having the binary code "10". This code directs SCR groups A–D to monitor messages during all message intervals 208, and message frames 216 numbered as 16, 19, 40 and 43. This assignment is illustrated by timing portion 322. This supergroup is useful when maximum flexibility in allocating messages to message frames 216 and SCR groups is desired.

It should be apparent to the reader at this point that the embodiments of the group hierarchy information field 212, as exemplified by Tables 1 and 2, provide a flexible means in which each office 6 in the system 5 can use for optimization of the battery life performance of SCR's 2. It will be appreciated by one skilled in the art that the embodiments presented for the group hierarchy information field 212 may also be combined to form more complex battery saving schemes.

Figure 8:
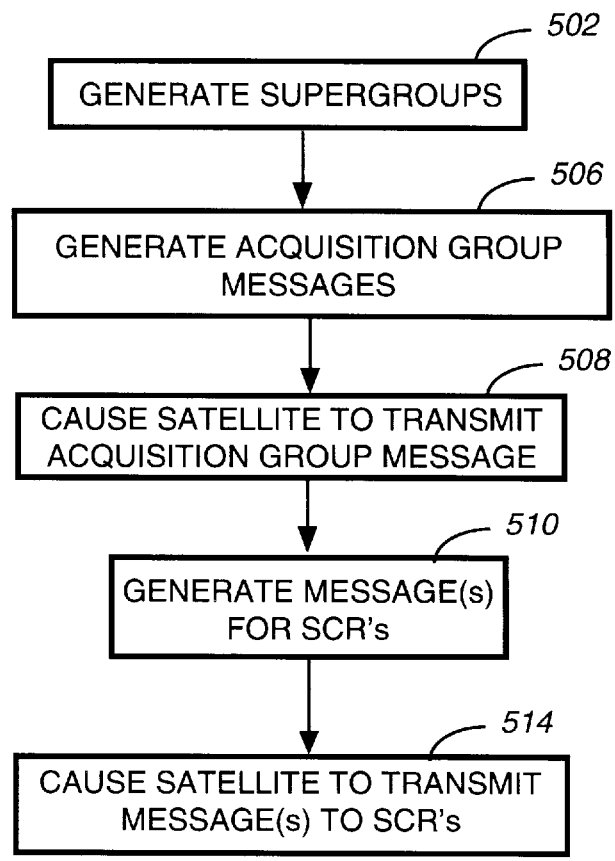
FIGS. 8 and 9 show flow charts depicting the operation of the controller and the SCR, respectively, according to the present invention.

FIGS. 6 through 8 depict electrical block diagrams of the SCR 2, the controller 6 and the satellite 1, respectively, according to the present invention.

According to FIG. 5, the SCR 2 comprises a receiver 404 coupled to a conventional antenna 402, a power switch 408, a processor 410, and a user interface 421. The receiver 404 and antenna 402 (through which communication link 7 is established) are utilized for receiving radio signals including messages transmitted by the satellite communication system 5. Preferably the receiver 404 recovers bi-phase shift keying (BPSK) and quadrature phase shift keying (QPSK) encoded data included in the transmission from link 7. The receiver 404 recovers digital data, which is then processed by the processor 410. Based on the digital data provided by the receiver 404, the processor 410 is programmed to reject or accept the radio signal received.

The power switch 408 is a conventional switch, such as a MOS (metal oxide semiconductor) switch for controlling power to the receiver 404 under the direction of the processor 410, thereby providing a battery saving function.

The processor 410 is used for controlling operation of the SCR 2. Generally, its primary function is to decode and process demodulated messages provided by the receiver 404, storing them and alerting a user of the received message. The demodulated messages are preferably decoded by the processor 410 according to the communication protocol 200 presented in FIG. 2. To perform the decoding function, the processor 410 comprises a conventional microprocessor 416 coupled to a conventional memory 418 having nonvolatile and volatile memory portions, such as a ROM (read-only memory) and RAM (random-access memory). One of the uses of the memory 418 is for storing messages received from the system 5. Another use is for storing one or more selective call addresses utilized in identifying incoming personal or group messages to be received by the SCR 2.

Once a message has been decoded and stored in the memory 418, the processor 410 activates the alerting device 422 (included in the user interface 421) which generates a tactile and/or audible alert signal to the user. The user interface 421, which further includes, for example, a conventional LCD display 424 and conventional user controls 420, is utilized by the user for processing the received messages. This interface provides options such as reading, deleting, and locking of messages.

It will be appreciated that, alternatively, more than one processor 410 may be used if additional processing power is needed to perform the functions of the present invention, and other general operating functions such as message processing, and user message interface functions.

FIG. 6 shows a block diagram of the controller 6 (which has also been referred to as a central switching office or gateway ) according to the present invention. The controller 6 includes a processor 432, which may be implemented by a single processor or by a network of processors. Processor 432 couples through a modulation/demodulation section 428 to an antenna 426. Antenna 426 is used in establishing communication link 8. Section 428 converts digital data produced (or used) by processor 432 into (or from) modulated RF communications compatible with link 8.

Controller 6 also includes a memory 434 which stores permanent and temporary data. Such permanent and temporary data include computer programs, data which do not change through operation of controller 6, and data which change through the operation of controller 6. A timer 433 also couples to processor 432. Timer 433 allows controller 6 to keep a current system time and to act, so that transmissions are sent from controller 6 in accordance with real-time demands. Through a public switched telecommunications network (PSTN) interface 430, processor 432 couples to PSTN 436. Requests to place calls to SCR's 2 may be received through PSTN 436 and interface 430. In addition, requests to place calls to SCR's 2 may be received through the network of satellites 1 (see FIG. 1) and link 8.

FIG. 7 shows a block diagram of the satellite 1 according to the present invention. Preferably, all satellites 1 within system 5 (see FIG. 1) are substantially described by the block diagram of FIG. 7. Satellite 1 includes cross-link transceivers 440 and cross-link antennas 438. Transceivers 440 and antennas 438 support cross-links 3 (FIG. 1) to other nearby satellites 1. Gateway link transceivers 444 and gateway link antennas 442 support gateway links 8 (FIG. 1) to communicate with gateways 6.

Moreover, subscriber unit transceiver 448 and subscriber unit link antennas 446 support SCR's 2 (FIG. 1). Preferably, each satellite 1 may simultaneously support links for up to a thousand or more of SCR's 2 (FIG. 1). Of course, those skilled in the art will appreciate that antennas 438, 442, and 446 may be implemented either as single multi-directional antennas or as banks of discrete antennas. It is desirable that subscriber unit antenna 446 be a phased-array antenna capable of accessing many cell regions simultaneously. In a preferred embodiment, up to forty-eight individual spot beams access an equal number of cell regions simultaneously.

A processor 452 couples to each of transceivers 440, 444, and 448 as well as to a memory 454 and a timer 450. Processor 452 may be implemented using one or more micro-processors. Processor 452 uses timer 450 to maintain the current date and time. Memory 454 stores data that serve as instructions to processor 452 and that, when executed by processor 452, cause satellite 1 to carry out procedures which are discussed in the controller 6 flowchart below (see FIG. 8). In addition, memory 454 includes variables, tables, and databases that are manipulated due to the operation of satellite 1.

Subscriber unit transceivers 448 are desirably multi-channel FDMA/TDMA (frequency division multiple access/ time division multiple access) transceivers capable of transmitting and receiving on all different selectable frequencies during particular, selectable, time slots as directed by processor 452. Subscriber unit transceivers 448 have a sufficient number of channels to provide the desired number of transmission and reception frequencies for communications. Subscriber unit transceivers 448 desirably provide for transmission and reception on any frequency channel set, so that each subscriber unit transceiver 448 may, if needed, utilize the entire spectral capacity of all frequency channel sets by having the capability to handle all frequency and time slot assignments.

The subscriber unit transceivers 448 transmit the SCR signals at higher power than the general traffic, duplex carriers. This additional power provides improved link margin over the general traffic channels. This additional link margin enhances the ability of the SCR signals to penetrate obstacles such as vehicles and buildings. It also permits less sensitive, and thus less expensive, SCR's 2 to be used with the system 5.

Figure 9:
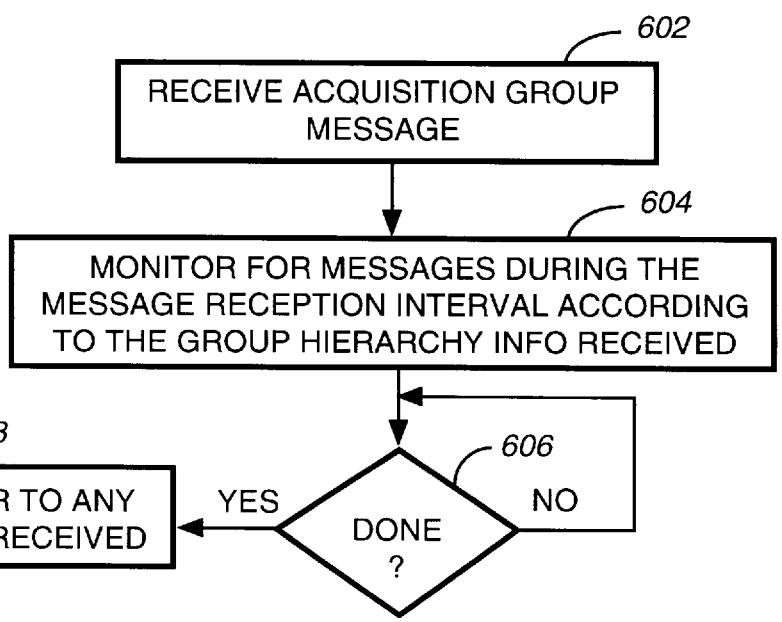

FIGS. 9 and 10 show flow charts 500, 600 depicting the operation of the controller 6 and the SCR 2, respectively, according to the present invention. Flow charts 500, 600 depict programmed instructions of the controller 6 and SCR 2 which are stored in their respective memories 434,418.

The steps shown in flow chart 500 pertain to the operations of the controller 6 for a single block interval 204. Thus the discussion that follows is repeated by the controller 6 for each of the remaining block intervals 204.

Flow chart 500 begins with step 502 where the controller 6 generates a plurality of supergroups. To accomplish this, the controller 6 subdivides the SCR's into a plurality of SCR groups, and assigns the SCR groups to a plurality of supergroups. The controller 6 further assigns a selected number of message frames 216 and message intervals 208 to each SCR group in each supergroup. Examples of these assignments were presented in Tables 1 and 2 (shown above). In step 506, the controller 6 generates a plurality of acquisition group messages 213 (preferably 48 messages—see FIGS. 2–5). Each acquisition group message 213 is designated for transmission during a selected one of the plurality of frames 210 of the acquisition group message interval 206.

To generate an acquisition group message 213, the controller 6 selects a supergroup from the plurality of supergroups, and includes in the acquisition group message 213, group hierarchy information corresponding to the supergroup. The group hierarchy information is included in the group hierarchy information field 212. The supergroup is used for directing a number SCR's 2 targeted to receive the selected acquisition group message 213 to monitor one or more messages during the message reception interval 203 according to the selected number of message frames 216 and message intervals 208 included in the supergroup.

Once the plurality of acquisition group messages 213 have been generated, the controller 6 proceeds to step 508 where it causes the satellite 1 to activate the transceiver 448 to transmit the plurality of acquisition group messages 213 during the acquisition group message interval 206. In step 510 the controller 6 generates one or more messages corresponding to one or more SCR's 2 assigned to the current block interval 204. Once the SCR messages have been generated, the controller 6 proceeds to step 514 where it causes the satellite 1 to activate the transceiver 448 to transmit the one or more messages during the message reception interval 203 according to the supergroup selected for each of the one or more SCR's 2. Note all communications between the controller 6 and the satellites 1 are accomplished by way of communication link 8.

Directing the readers attention to FIG. 9, flow chart 600 begins with step 602 where the SCR 2 invokes the receiver 404 to monitor an acquisition group message 213 transmitted by a satellite 1. As described above, the acquisition group message 213 comprises group hierarchy information, which directs the SCR 2 to a selected number of message frames 216 and message intervals 208. In step 604, the SCR 2 causes the receiver 404 to monitor one or more messages during the message reception interval 203 according to the group hierarchy information (corresponding to a selected supergroup) received and the supergroup for which the SCR 2 belongs to. Once one or more messages are detected during the message reception interval 203 in step 606, the SCR 2 processes the messages as described above for FIG. 5 and proceeds to step 608. In step 608, the SCR 2 alerts its user of the pending messages received.

Although not shown in FIG. 9, the processor 410 of the SCR 2 is programmed to power down the receiver 404 and portions of the processor 410 during the message reception interval 203 according to the selected number of message intervals 208 and message frames 216 directed by the acquisition group message 213. This operation corresponds to a battery-saving mode of the SCR 2, which is based on a selected supergroup sent with the acquisition group message 213. The combined instructions received from the group hierarchy information field 212 and the visitation schedule field 214 provide flexible means for optimizing the battery life of SCR's 2 under variable message traffic conditions.

In sum, the present invention provides an advantageous method and apparatus for optimizing the battery life performance of both satellites 1 and SCR's 2. This is accomplish by the combined use of the group hierarchy information field 212 and the visitation schedule field 214. Together these fields provide controllers 6 the ability to optimize the battery life performance of satellites 1 and SCR's 2 in accordance with existing message traffic conditions.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a radio communication system, a method for transmitting messages to a plurality of SCR's (selective call receivers) during a message reception interval, the message reception interval comprising a plurality of message intervals, each message interval comprising a plurality of message frames, the method comprising the steps of:
  subdividing the SCR's into a plurality of SCR groups;
  assigning the SCR groups to a plurality of supergroups;
  assigning a selected number of message frames and message intervals to each SCR group in each supergroup;
  selecting a supergroup from the plurality of supergroups;
  generating an acquisition group message;
  including in the acquisition group message, group hierarchy information corresponding to the supergroup selected, the supergroup directing a number of SCR's targeted to receive the acquisition group message to monitor one or more messages during the message reception interval according to the selected number of message frames and message intervals included in the supergroup;
  transmitting the acquisition group message to the SCR's;
  generating one or more messages corresponding to one or more SCR's; and
  transmitting the one or more messages during the message reception interval according to the supergroup selected.

2. The method as recited in claim 1, wherein the plurality of SCR's are subdivided into SCR groups based on a plurality of address ranges of the SCR's.

3. The method as recited in claim 1, wherein the acquisition group message further comprises a visitation schedule, the visitation schedule directing SCR's to monitor messages during a selected number of the plurality of message frames for each of the plurality of message intervals.

4. The method as recited in claim 1, wherein the radio communication system comprises a satellite communication system including at least one controller coupled to at least one satellite having a transmitter.

5. In a radio communication system, a method for transmitting messages to a plurality of SCR's (selective call receivers), each SCR assigned to a selected one of a plurality of block intervals, each block interval comprising an acquisition group message interval and a message reception interval, the acquisition group message interval comprising a plurality of frames, the message reception interval comprising a plurality of message intervals, each message interval comprising a plurality of message frames, the method comprising the steps of:
  for a selected one of the plurality of block intervals,
    subdividing the SCR's into a plurality of SCR groups;
    assigning the SCR groups to a plurality of supergroups;
    assigning a selected number of message frames and message intervals to each SCR group in each supergroup;
    generating at least one acquisition group message, wherein each acquisition group message is designated for transmission during a selected one of the plurality of frames, and wherein generating a selected acquisition group message comprises the steps of:
      selecting a supergroup from the plurality of supergroups, and
      including in the selected acquisition group message, group hierarchy information corresponding to the supergroup selected, the supergroup directing a number of SCR's targeted to receive the selected acquisition group message to monitor one or more messages during the message reception interval according to the selected number of message frames and message intervals included in the supergroup;
  transmitting the at least one acquisition group message during the acquisition group message interval;
  generating one or more messages corresponding to one or more SCR's assigned to the selected one of the plurality of block intervals; and
  transmitting the one or more messages during the message reception interval according to the supergroup selected.

6. The method as recited in claim 5, wherein the plurality of SCR's are subdivided into SCR groups based on a plurality of address ranges of the SCR's.

7. The method as recited in claim 5, wherein each acquisition group message further comprises a visitation schedule, the visitation schedule directing SCR's to monitor messages during a selected number of the plurality of message frames for each of the plurality of message intervals.

8. The method as recited in claim 5, wherein the radio communication system comprises a satellite communication system including at least one controller coupled to at least one satellite having a transmitter.

9. In a selective call receiver (SCR), a method for receiving messages transmitted by a transmitting unit during a message reception interval, the message reception interval comprising a plurality of message intervals, the method comprising the steps of:

receiving an acquisition group message transmitted by the transmitting unit, the acquisition group message comprising group hierarchy information corresponding to a selected one of a plurality of supergroups, wherein each supergroup comprises a plurality of SCR groups, wherein each SCR group includes a selected number of SCR's in a radio communication system, and wherein each SCR group is assigned by the radio communication system a selected number of message frames and message intervals according to each SCR group's supergroup; and monitoring one or more messages during the message reception interval according to the supergroup received and the SCR group for which the SCR belongs to.

10. The method as recited in claim 9, wherein the SCR proceeds to a battery-saving mode during the message reception interval according to the supergroup received.

11. The method as recited in claim 9, wherein the radio communication system comprises a satellite communication system; and wherein the transmitting unit comprises at least one satellite having a transmitter.

12. A radio communication system, comprising a transmitting unit for transmitting messages to a plurality of SCR's (selective call receivers) during a message reception interval, the message reception interval comprising a plurality of message intervals, each message interval comprising a plurality of message frames; and at least one controller coupled to the transmitting unit, the at least one controller adapted to:

subdivide the SCR's into a plurality of SCR groups;

assign the SCR groups to a plurality of supergroups;

assign a selected number of message frames and message intervals to each SCR group in each supergroup;

select a supergroup from the plurality of supergroups;

generate an acquisition group message;

include in the acquisition group message, group hierarchy information corresponding to the supergroup selected, the supergroup directing a number of SCR's targeted to receive the acquisition group message to monitor one or more messages during the message reception interval according to the selected number of message frames and message intervals included in the supergroup;

cause the transmitting unit to transmit the acquisition group message to the SCR's;

generate one or more messages corresponding to one or more SCR's; and cause the transmitting unit to transmit the one or more messages during the message reception interval according to the supergroup selected.

13. The radio communication system as recited in claim 12, wherein the plurality of SCR's are subdivided into SCR groups based on a plurality of address ranges of the SCR's.

14. The radio communication system as recited in claim 12, wherein the acquisition group message further comprises a visitation schedule, the visitation schedule directing SCR's to monitor messages during a selected number of the plurality of message frames for each of the plurality of message intervals.

15. The radio communication system as recited in claim 12, wherein the transmitting unit comprises at least one satellite having a transmitter.

16. The radio communication system as recited in claim 12, wherein the at least one controller is stationed on earth.

17. A radio communication system, comprising:

a transmitting unit for transmitting acquisition group messages and for transmitting messages to a plurality of SCR's (selective call receivers), each SCR assigned to a selected one of a plurality of block intervals, each block interval comprising an acquisition group message interval and a message reception interval, the acquisition group message interval comprising a plurality of frames, the message reception interval comprising a plurality of message intervals, each message interval comprising a plurality of message frames; and at least one controller coupled to the transmitting unit, the at least one controller adapted to:

for a selected one of the plurality of block intervals, subdivide the SCR's into a plurality of SCR groups;

assign the SCR groups to a plurality of supergroups;

assign a selected number of message frames and message intervals to each SCR group in each supergroup;

generate at least one acquisition group message, wherein each acquisition group message is designated for transmission during a selected one of the plurality of frames, and wherein generating a selected acquisition group message comprises the steps of:

selecting a supergroup from the plurality of supergroups, and including in the selected acquisition group message, group hierarchy information corresponding to the supergroup selected, the supergroup directing a number of SCR's targeted to receive the selected acquisition group message to monitor one or more messages during the message reception interval according to the selected number of message frames and message intervals included in the supergroup;

cause the transmitting unit to transmit the at least one acquisition group message during the acquisition group message interval;

generate one or more messages corresponding to one or more SCR's assigned to the selected one of the plurality of block intervals; and cause the transmitting unit to transmit the one or more messages during the message reception interval according to the supergroup selected.

18. The radio communication system as recited in claim 17, wherein the plurality of SCR's are subdivided into SCR groups based on a plurality of address ranges of the SCR's.

19. The radio communication system as recited in claim 17, wherein each acquisition group message further comprises a visitation schedule, the visitation schedule directing SCR's to monitor messages during a selected number of the plurality of message frames for each of the plurality of message intervals.

20. The radio communication system as recited in claim 17, wherein the at least one controller is stationed on earth.

21. The radio communication system as recited in claim 17, wherein the transmitting unit comprises at least one satellite having a transmitter.

22. A selective call receiver (SCR), comprising:

a receiver for receiving messages transmitted by a transmitting unit during a message reception interval, the message reception interval comprising a plurality of message intervals; and a processor coupled to the receiver, the processor adapted to:
  cause the receiver to monitor an acquisition group message transmitted by the transmitting unit, the acquisition group message comprising group hierarchy information corresponding to a selected one of a plurality of supergroups, wherein each supergroup comprises a plurality of SCR groups,
  wherein each SCR group includes a selected number of SCR's in a radio communication system, and
  wherein each SCR group is assigned by the radio communication system a selected number of message frames and message intervals according to each SCR group's supergroup; and
  cause the receiver to monitor one or more messages during the message reception interval according to the supergroup received and the SCR group for which the SCR belongs to.

23. The SCR as recited in claim 22, wherein the processor is further adapted to power down the receiver and portions of the processor during the message reception interval according to the supergroup received.

24. The SCR as recited in claim 22,
  wherein the radio communication system comprises a satellite communication system; and
  wherein the transmitting unit comprises at least one satellite having a transmitter.

* * * * *